(12) United States Patent (10) Patent No.: US 8,798,929 B2
Tsuji et al. (45) Date of Patent: Aug. 5, 2014

(54) NAVIGATION APPARATUS

(75) Inventors: Kenji Tsuji, Gifu (JP); Daisuke Tomita, Nagoya (JP); Yasuhiro Shimizu, Tokoname (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 12/969,618

(22) Filed: Dec. 16, 2010

(65) Prior Publication Data

US 2011/0153200 A1 Jun. 23, 2011

(30) Foreign Application Priority Data

Dec. 18, 2009 (JP) ................................ 2009-287940
Nov. 15, 2010 (JP) ................................ 2010-255006

(51) Int. Cl.
*G01C 21/36* (2006.01)
*G01C 1/00* (2006.01)

(52) U.S. Cl.
USPC ............................ 701/533; 701/435; 701/437

(58) Field of Classification Search
CPC ................................................. G01C 21/3658
USPC .................. 701/532, 533, 118, 414, 428, 435
See application file for complete search history.

(56) References Cited

U.S. PATENT DOCUMENTS

| 6,295,503 | B1 | 9/2001 | Inoue et al. | |
| 2001/0021895 | A1* | 9/2001 | Yamazaki | .................... 701/211 |
| 2008/0288163 | A1 | 11/2008 | Asano | |
| 2009/0164116 | A1 | 6/2009 | Kawauchi | |
| 2009/0248294 | A1 | 10/2009 | Machino | |
| 2010/0063720 | A1 | 3/2010 | Machino | |

FOREIGN PATENT DOCUMENTS

| JP | H08-287393 A | 11/1996 |
| JP | A-2000-131085 | 5/2000 |
| JP | 2003-281690 A | 10/2003 |
| JP | 2004-144712 A | 5/2004 |

OTHER PUBLICATIONS

Office Action mailed Jun. 25, 2013 in the corresponding JP application No. 2010-255006 (English translation).

* cited by examiner

*Primary Examiner* — Helal A Algahaim
*Assistant Examiner* — Charles J Han
(74) *Attorney, Agent, or Firm* — Posz Law Group, PLC

(57) ABSTRACT

In a navigation apparatus, HOV information related to a high-occupancy vehicle lane or carpool lane is added into node data of a node as a part of the node data in map data. The HOV information of all nodes in a highway in a guide route is acquired from the map data to calculate the total number of transfer permit points. When it is determined that a guide for HOV is possible based on the calculated total number of transfer permit points, and then it is determined that an entry distance from the present position to a nearest transfer permit point is in a predetermined range suitable for an entrance guide into the carpool lane, the entry distance is determined to be suitable for the entrance guide into the carpool lane. Thereby the entrance guide into the carpool lane is provided.

17 Claims, 7 Drawing Sheets

FIG. 5A

FORMAT FOR NODE DATA OF NODE (n)

| DATA ELEMENTS |
|---|
| NODE ID |
| COORDINATES |
| INTERSECTION KIND |
| CONNECTING LINK IDS |
| ... |
| ... |
| HOV INFO |

FIG. 5B

FORMAT FOR LINK DATA OF LINK (n)

| DATA ELEMENTS |
|---|
| LINK ID |
| STARTING NODE ID |
| ENDING NODE ID |
| ROAD NUMBER |
| ROAD KIND |
| LANE NUMBER |
| TRAFFIC REGULATION INFO |
| ... |
| ... |

NAVIGATION APPARATUS

CROSS REFERENCE TO RELATED APPLICATION

The present application is based on and incorporates herein by reference Japanese Patent Applications No. 2009-287940 filed on Dec. 18, 2009 and No. 2010-255006 filed on Nov. 15, 2010.

FIELD OF THE INVENTION

The present invention relates to a navigation apparatus, which is mounted in a vehicle while executing a navigation process using road map data.

BACKGROUND OF THE INVENTION

[Patent Document 1] JP-2001-183159 A (Corresponding to US-2001-021895 A1)

There is known a navigation apparatus that detects a position of a vehicle using GPS etc. along with traveling of the vehicle to display the detected position together with a road map on a display window, and designate a suitable route from a present position to a destination to thereby use it for a route guide. This contributes to a smoother driving manipulation. In the route guide during the traveling of the vehicle, a display of the guide route is highlighted so as to differentiate from other roads by making it thicker and changing it in colors; an intersection the vehicle enters next is highlighted by using an enlargement display; and/or an audio route guide is made. The user can be thereby guided to a destination.

To designate a guide route, the well-known Dijkstra method or another similar method may be used. In detail, a route calculation cost (evaluation value for a route) from a present position to each node is calculated using link data on links between nodes. When all the calculations of costs up to the destination are completed, links are connected so as to minimize the total cost to thereby designate a route to the destination. Such a route needs to be connected travelably to the destination; for example, a route, which contains a road the vehicle cannot enter such as a one-way traffic road or a pedestrian road, cannot be adopted. Therefore, when it turns out that such a traffic regulation exists from information on inter-link connection, the corresponding route is removed from candidates.

Incidentally, unlike in the above-mentioned pedestrian road or one-way traffic road, another traffic regulation is not applied uniformly to all vehicles. One example of such a traffic regulation is a carpool lane, which is mainly seen in road systems in highways (freeways) of big cities in the United States of America. This carpool lane is provided to recommend riding together for the purpose of reduction of the number of vehicles traveling roads. In detail, when the number of occupants in a vehicle is several, the traveling of the vehicle is allowed; when single, the traveling of the vehicle is not allowed. Since the ratio of the vehicle in which any passenger other than the driver is not present is high in the United States of America, the carpool lane is vacant compared with a general lane. The vehicle in which two or more passengers are present can shorten the travel time by running this carpool lane. It is noted that the carpool lane may be also called an HOV lane (High-Occupancy Vehicles Lane).

This carpool lane may exist as a road other than a general road that has no restriction, whereas the carpool lane may exist as a lane (i.e., a driveway) that is one of several lanes provided by partitioning a single road into several lanes using only a lane marker or a guardrail. Even in the case of partitioning using a lane marker, reciprocal transfer or accesses intercommunicating between a general lane and a carpool lane can be allowed only via a predetermined permit point or permit road section.

Further, an exit from a highway road to another road such as a branch road may be connected only via a general lane. A driver of a vehicle running a carpool lane of a highway road may be aware of approaching a highway exit using a map image around the vehicle present position displayed on a display window of a navigation apparatus or route guide function. Even in such a case, since any entrance point (also referred to as a transfer permit point) from the carpool lane to the general lane (i.e., an exit point from the carpool lane) is not existing, the vehicle cannot return to the general lane. The highway exit may be passed as a result. Such an inconvenient event may be sometimes undergone, in particular, in highways having many lanes around big cities.

To avoid such an inconvenient event, it may be suggested that the vehicle depart from the carpool lane, a little earlier, to return to the general lane. In this regard, however, if returning to the general lane when other several exiting points are still located ahead, the travel distance of the carpool lane becomes relatively short. This poses a disadvantage to be unable to provide an efficient travel. In addition, such a disadvantage may take place not only when running the above-mentioned carpool lane but also when running one of general lanes in which the vehicle is not allowed to enter the other general lane of the same road.

Patent document 1 discloses a technology focusing on countermeasure against the above disadvantage, for example. As illustrated in FIG. 6, in the technology indicated by Patent document 1, for instance, road map data for a road 1000 are additionally assigned or provided with newly added nodes and links, which are newly added nodes and links dedicated to each of transfer permit points in a carpool (HOV) lane, and the node data and link data dedicated for HOV (referred to as HOV node data and HOV link data) are used for a predetermined navigation process. In such HOV node data, a presence or absence of a navigational guide for HOV (referred to as an HOV guide) is associated with a guide display image for blanching to a branch road so as to selectively display. Such a guide display image may be specifically contained in the corresponding HOV node data. A navigation process can be thereby executed which considers the limitations or restrictions on the reciprocal transfer (entrance and exit) between the carpool lane and the general lane. The traveling of the carpool lane can be thus made efficiently.

However, in the technology described in D1, it is necessary to hold the link data and node data, which are dedicated to carpool lanes, in addition to the existing or conventional road map data; thus, while the data amount of road map data is increased, the complicated work is necessary for adding those data for carpool lanes into the existing road map data. This poses a problem.

In the above, the carpool lane is considered as a specific example; however, another road configuration should be similarly considered. That is, in a road configuration, "a single road has a plurality of road lanes with an identical traffic direction including (i) a special lane and (ii) a general lane, wherein the special lane has no exit to another road while the general lane has an exit to another road; a reciprocal transfer or access between the special lane and the general lane is allowed only via a predetermined transfer permit point" Such an example of the above road configuration is a road configuration having an express lane and a local lane in an eastern region in the United States of America.

SUMMARY OF THE INVENTION

It is an object to provide a navigation apparatus that performs an appropriate route guide when traveling a predetermined road, in which: a single road has a plurality of road lanes with an identical traffic direction including (i) a special lane and (ii) a general lane, wherein the special lane has no exit to another road while the general lane has an exit to another road; a reciprocal transfer or access between the special lane and the general lane is permitted only via a predetermined permit point (i.e., a transfer permit point).

To achieve the above object, as an example of the present invention, a navigation apparatus in a vehicle is provided as follows. The vehicle travels a predetermined road that includes, in an identical traffic direction, (i) a general lane having an exit into an other road and (ii) a special lane having no exit into an other road, the general lane and the special Jane having a plurality of transfer permit points, at each of which the vehicle is only allowed to transfer between the general lane and the special lane. An information storage section is configured to store transfer permit point information which is associated with a node of a plurality of nodes, the transfer permit point information indicating (i) a number of transfer permit points, which are ahead of the node in the traffic direction and (ii) relative positional information indicating a positional relation between the transfer permit point and the node. A present position specification section is configured to specify a present position of the vehicle. A guide section is configured to provide a user with a navigational guide. A control circuit is configured to execute a predetermined navigation process based on the transfer permit point information stored in the information storage section and the present position specified by the present position specification section. The control circuit is further configured to, in the predetermined navigation process, (i) determine whether there is existing more than one transfer permit point ahead of the present position in the traffic direction between a nearest node, which is a node nearest from the present position, and a branch node, which is a node at which the vehicle exits from the predetermined road to an other road, (ii) calculate, when it is determined that there is existing more than one transfer permit point, an entry distance up to a nearest transfer permit point, which is a transfer permit point nearest to the present position among the more than one transfer permit point existing between the nearest node and the branch node, using the relative positional information corresponding to the nearest transfer permit point, (iii) determine whether the calculated entry distance is within a predetermined distance range, and (iv) provide information regarding the nearest transfer permit point via the guide section, when it is determined that the calculated entry distance is within the predetermined distance range.

Thus, under the above configuration of the navigation apparatus, an appropriate route guide can be achieved for a vehicle running a predetermined road or road configuration, which has (i) a special lane a travel of which is allowed for the vehicle with a special condition satisfied and (ii) a general lane a travel of which is allowed for the vehicle without need of the special condition satisfied, the predetermined road having a predetermined transfer permit point (referred to as a transfer permit road section) at which the vehicle is only permitted to enter from one of the special lane and the general lane to the other.

As a second example of the present invention, a navigation, apparatus in a vehicle is provided as follows. A present position detection section is configured to detect a present position of the vehicle. A map data storage, section is configured to store road map data including node information and link information. A route guide section is configured to retrieve a guide route from a present position to a destination based on the road map data stored in the map data storage section, and execute a navigational guide along the retrieved guide route. Herein: the node information contained in the map data storage section contains relative positional information indicating a relative position between a node and a predetermined permit road section nearest from the node, wherein the vehicle is only allowed via the predetermined permit road section to transfer between (i) one lane of a plurality of lanes in a predetermined road and (ii) an other lane of the plurality of lanes in the predetermined road; and the route guide section provides a navigational guide towards the predetermined permit road section based on the relative positional information and the present position detected by the present position detection section.

Thus, under the above configuration of the second example, an advantage can be provided similarly to that of the first example.

As a third example of the present invention, a method is provided for the predetermined navigational process in the navigation apparatus as the first example. That is, the method comprises: providing, into the map data, transfer permit point information which is associated with a node of a plurality of nodes, the transfer permit point information indicating (i) a number of transfer permit points, which are ahead of the node in the traffic direction and (ii) relative positional information indicating a positional relation between the transfer permit point and the node; determining whether there is existing more than one transfer permit point ahead of the present position in the traffic direction between a nearest node, which is a node nearest from the present position, and a branch node, which is a node at which the vehicle exits from the predetermined road to the other road; calculating, when it is determined that there is existing more than one transfer permit point, an entry distance up to a nearest transfer permit point, which is a transfer permit point nearest to the present position among the more than one transfer permit point existing between the nearest node and the branch node, using the relative positional information corresponding to the nearest transfer permit point; determining whether the calculated entry distance is within a predetermined distance range; and providing information regarding the nearest transfer permit point via the guide section, when it is determined that the calculated entry distance is within the predetermined distance range.

Thus, under the above configuration of the third example, an advantage can be provided similarly to that of the first example or second example.

BRIEF DESCRIPTION OF THE DRAWINGS

The above and other objects, features, and advantages of the present invention will become more apparent from the following detailed description made with reference to the accompanying drawings. In the drawings:

FIGS. 5A, 5B are diagrams for explaining data configuration of node data and link data, respectively, according to the embodiment.

DETAILED DESCRIPTION OF THE PREFERRED EMBODIMENTS

Hereinafter, description will be given to an embodiment of the present invention with reference to the drawings.

[Embodiment]

Figure 1:
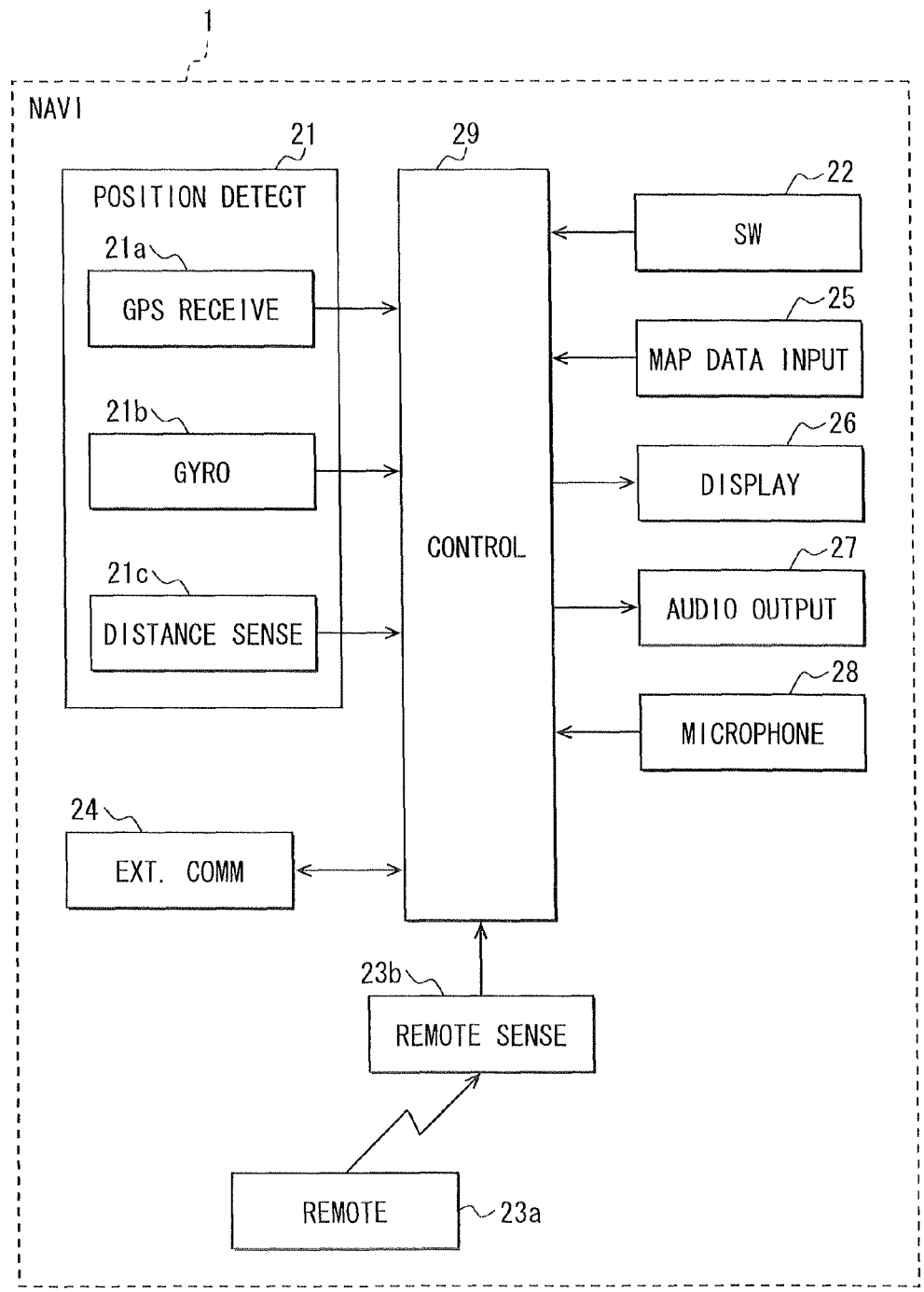
FIG. 1 is a diagram illustrating a configuration of a navigation apparatus according to an embodiment of the present invention.
Figure 2:
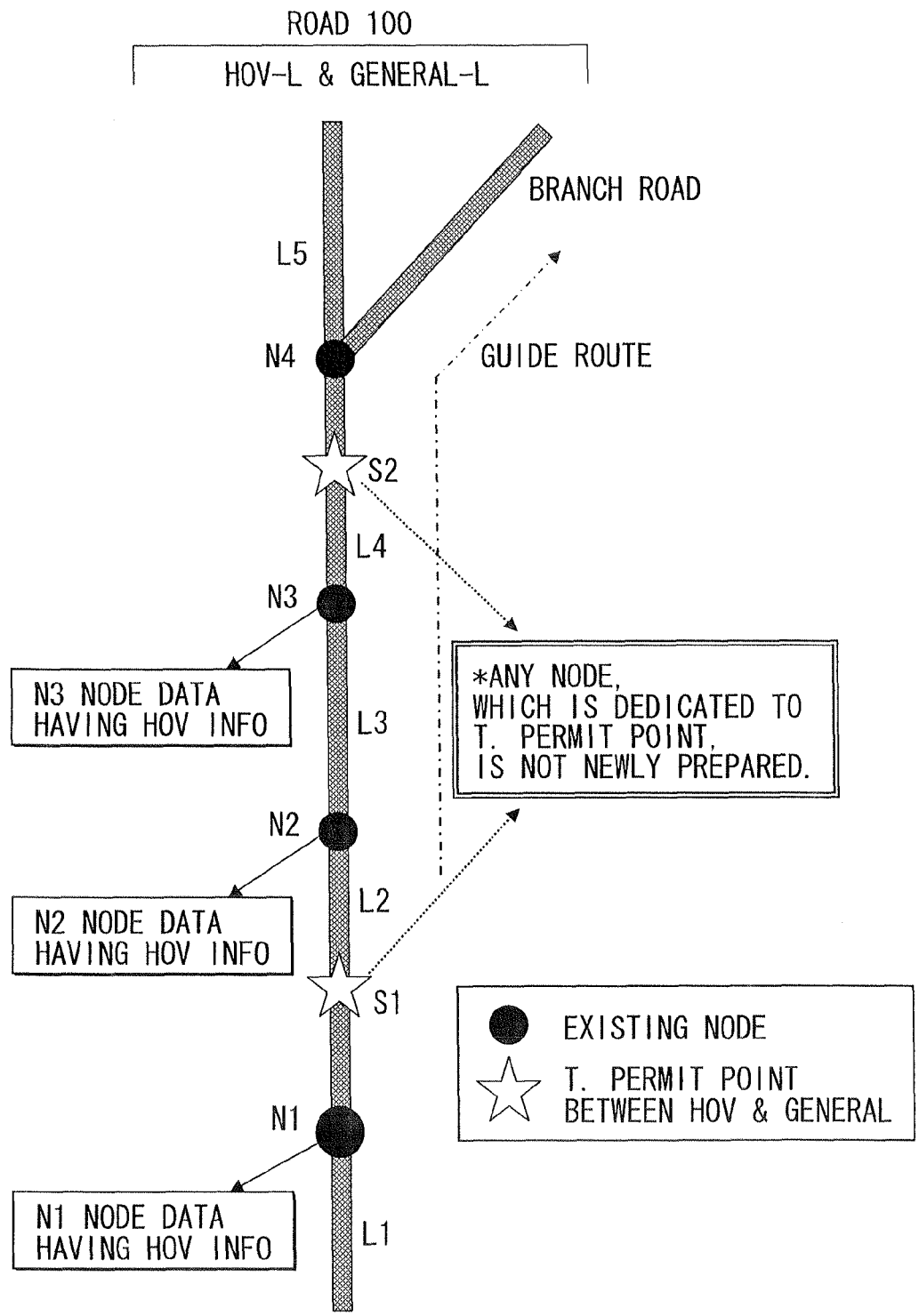
FIG. 2 is a diagram explaining a guide control process according to the embodiment.

FIG. 1 is a block diagram showing a configuration of an in-vehicle navigation apparatus 1 according to an embodiment of the present invention. FIG. 2 is a diagram explaining a guide control process according to the present embodiment.

[1. Configuration of Navigation Apparatus]

As illustrated in FIG. 1, the navigation apparatus 1 is mounted in a subject vehicle and includes the following: a position detection device 21 for detecting a present position of the vehicle; an operation switch group 22 for inputting various instructions from a user; a remote control terminal 23a provided as a different body unit from the main body of the navigation apparatus 1 for inputting various instructions from a user like the operation switch group 22; a remote control sensor 23b for inputting a signal from the remote control terminal 23a; an external communications device 24 connected with a packet communications network etc. for communicating with an outside; a map data input device 25 for inputting data from a map storage medium recording road map data or audio data; a display device 26 for displaying a map or a variety of information; an audio output device 27 for outputting various kinds of guide sounds; a microphone 28 for outputting an electric signal based on a sound uttered by a user; and a control circuit 29. The control circuit 29 executes various processing according to inputs from the position detection device 21, the operation switch group 22, the remote control sensor 23b, the external communications device 24, the map data input device 25, and the microphone 28; it controls the external communications device 24, the display device 26, and the audio output device 27.

The position detection device 21 includes the following sensors or the like: a GPS receiver 21a, which receives via a GPS antenna (not shown) electric waves from satellites for GPS (Global Positioning System) and outputs reception signals; a gyroscope 21b which detects rotational movement exerted over the vehicle; and a distance sensor 21c which detects a travel distance of the subject vehicle. Based on signals outputted from sensors or the like 21a to 21c, the control circuit 29 calculates a position, direction, speed, etc. of the vehicle. In addition, although there are several methods to calculate a present position based on a signal outputted from the GPS receiver 21a, an independent positioning method or a relative positioning method may be used.

The position detection device 21 can be also referred to a present position specification device, section, or means. The operation switch group 22 includes a mechanical key switch arranged in the circumference of the display device 26 and a touch sensitive panel laminated on and integrated into a surface of a screen on the display device 26. The touch panel and the display device 26 are laminated integrally. In addition, although the touch panel includes various types to detect a user's manipulation such as a pressure-sensitive type, an electromagnetic induction type, a capacitive sensing type, or a type combining the foregoing, any type may be used in the present embodiment.

The external communications device 24 acquires traffic information such as accident information or congestion information from a traffic information center such as VICS (Vehicle Information Communication System) via a light beacon, a radio wave beacon, etc. provided in road sides. The map data input device 25 is used for inputting various data stored in a map data storage media such as a hard disk or DVD-ROM (none shown).

Herein, the map storage medium can be also referred to as a map data storage device, section, or means. The display device 26 includes a color display screen and can be a liquid crystal display, an organic electroluminescence display, or a CRT, or the like. The display device 26 displays a map and associated data in superimposition. The associated data include: a present position mark indicating a present position of the vehicle, which is specified from a present position detected by the position detection device 21 and the road map data inputted from the map data input device 25; a guide route to a destination; names; landmarks; and facility marks. Further, the guide information of the facilities can be displayed.

The audio output device 27 can output various guide or a guide sound of a facility inputted from the map data input device 25. The display device 26 and/or the audio output device 27 can be also referred to as a guide device, section, or means.

The microphone 28 outputs electric signal (sound signal) based on sound inputted to the control circuit 29, when a user inputs utterance (i.e., speech). By inputting various speeches into the microphone 28, the user can operate the navigation apparatus 1.

The control circuit 29 includes a known microcomputer having a CPU, ROM, RAM, SRAM, I/O, and a bus line connecting the foregoing. The control circuit 29 executes various processes based on programs stored in the ROM or RAM.

For example, based on each detection signal from the position detection device 21, a present position of the vehicle is calculated as a group of coordinates and a heading direction; then, a map or the like in proximity to the calculated present position is read out from the map data input device 25 and displayed in the display device 26. This can be called a map display process. A route calculation process is performed by the following: designating a destination based on the road map data from the map data input device 25 according to an input via the operation switch group 22 or remote control terminal 23a; and calculating an optimal route from the present position to the designated destination on the road map data from the map data input device 25. A route guide process is performed by displaying the calculated optimal route in the display device 26 and/or by outputting corresponding guide speeches via the audio output device 27.

In the route guide process, a guide point required to output guide is calculated based on the result of the route calculation process, the data of the configuration of the road stored in the road map data, the position information on intersections or crossings, etc.; further, it is determined what kind of guide (e.g., turning right or left, so-called navigation) is necessary.

Furthermore, the control circuit 29 can be also referred to as a control device, section, or means.

[2. Explanation of Road Map Data]

As explained above, the map data input device 25 is used for inputting various data stored in a map storage medium (unshown). The map data storage medium stores road map data (i.e., map data), audio data for guide, voice recognition data, etc. The road map data includes node numbers, link numbers, road configuration data, road width data, road kink data, road identification numbers, road regulation data, geographical data, mark data, intersection data, facility data, etc.

The road map data are constructed as multiple units each having a rectangular shape divided with predetermined longitude and latitude. The road map data of each unit can be designated and read out by specifying an identification number of its own. The road map data of each unit includes the following: a "drawing unit" which contains various kinds of data required for map display; a "road unit" which contains data required for various kinds of processes such as a map matching, a route retrieval, and a route guide; and an "intersection unit" which contains detailed data such as an intersections. In addition, the above-mentioned drawing unit contains data of a background layer required in order to display a building or a river, and data of a character layer required in order to display a name of a city, a town, a village, or a road.

In addition, in the road unit, a link is defined as a line which connects a first intersection of a road with a second intersection adjacent to the first intersection; a node is defined as an intersection connects two or more links. In addition, the road unit contains a "unit header" for identifying that it is a road unit, a "connection node table" which contains detailed data of all the nodes, a "node table" for indicating the storage position of the connection node table, and a "link table" which contains detailed data of each link specified by two adjoining nodes. Furthermore, node data is generated for each node; each node data for each node has a data configuration or format which contains several data elements. For instance, as illustrated in FIG. 5A, the format for the node data of a single node (n) contains the data elements such as a node identification number (ID), a coordinates of a longitude and a latitude, an intersection kind, and identification numbers (IDs) of all the links connected. Furthermore, similarly, link data is generated for each link; each link data for each link has a data configuration or format which contains several data elements. For instance, as illustrated in FIG. 5B, the format for the link data of single link (n) contains the data elements such as a link identification number (ID), node identification numbers (IDs) of the connection nodes of both starting node and ending node, a road number, a road kind, the number of lanes, and traffic regulation information on road. Herein, (n) is used for indicating a certain node or a certain link. Furthermore, according to the present embodiment (again, refer to FIG. 5A), the node data further contain, as an additional data element, relative information on HOV (i.e., HOV information or HOV related information), which is explained later. It is noted that the connection node table, node table, and node data may be collectively referred to node information, whereas the link table and link data may be collectively referred to as link information.

Actual roads or road ranges corresponding to links include (A) a road or road range containing a carpool lane, and (B) a road or road range further containing a predetermined transfer permit point (or a predetermined transfer permit road section) at which a vehicle is permitted to make a reciprocal entry or access (i.e., transfer) between a carpool lane and a general lane in the same road. It is noted that the carpool lane may be also called an HOV lane (High-Occupancy Vehicles Lane) ("HOV-L" is used in the drawings). The above-mentioned transfer permit point at which a vehicle is allowed to transfer between a carpool lane and a general lane is previously designated or predetermined. For instance, the transfer permit point may be defined as follows. Suppose a road or road configuration which has several lanes with an identical traffic direction (i.e. vehicle heading direction); the several lanes include a general lane which has an exit to another road and a special lane (i.e., carpool lane) which has not an exit to another road. In such a road configuration, a transfer permit point or road section may be defined as a point at which an access or entry is only permitted reciprocally to enter one of the general lane and the special lane from the other. That is, the vehicle is allowed to perform a reciprocal access to go back and forth between the carpool lane and the general lane only via the transfer permit point, whereas the reciprocal access or transfer is prohibited at any point except the transfer permit point. Further, in the transfer permit point or road section, a lane marker in between a carpool lane and a general lane is differentiated in color from lane markers in other road sections or ranges. In addition, a vehicle that satisfies a predetermined condition (for example, when the number of passengers including the driver is two or more) can transfer from the general lane to the carpool lane.

The present embodiment is characterized by responding to the above situation by adding relative information on HOV (referred to as HOV information) to the node data of a node (n), which has been established. The HOV information of the node (n) at least contains information about a nearest transfer permit point which exists ahead of the node (n) in the traffic direction or vehicle heading direction and nearest from the node (n). For example, FIG. 2 illustrates a road 100 having an HOV lane and a general lane, while including four nodes N1 to N4, five links L1 to L5, and two transfer permit points S1 to S2. Further, for instance, the node N1 has HOV information about a nearest transfer permit point S1, and each of nodes N2, N3 has HOV information about a nearest transfer permit point S2. Further, for instance, the HOV information relative to a node (n) contains at least (i) the number of transfer permit points and (ii) relative positional information which indicates a relative positional relation between the node (n) and a transfer permit point nearest from the node (n). It is noted that the number of transfer permit points is referred to as the number of the transfer permit points existing in between the node (n) and the subsequent node, which is next to the node (n) in the traffic direction. For example, in FIG. 2, since the one transfer permit point S1 exists between the node N1 and the node N2, the number of one (1) is stored as the number of transfer permit points in the HOV information of the node data of the node N1. In addition, the relative positional information signifies information about a traveling distance detected or undergone when a vehicle travels along a traffic-directional configuration of the road 100 from the node (n) to the nearest transfer permit point.

Furthermore, for example, in FIG. 2, since no transfer permit point exists between the node N2 and the node N3, the number of zero (0) is stored as the number of transfer permit points in the HOV information of the node data of the node N2. For example, if two transfer permit points (not shown) exist between a node (n) and the subsequent node next to the node (n), the number of two (2) is stored as the number of transfer permit points in the HOV information of the node data of the node (n). In such a case, the relative positional information includes information about a traveling distance detected or undergone when a vehicle travels along a traffic-directional road configuration of the road from the node (n) to each of the subsequent two transfer permit points short of the subsequent node next to the node (n). In other words with respect to all the transfer permit points existing between the node (n) and a subsequent node next to the node (n), their relative positional relations with the node (n) are indicated in the HOV information of the node data of the node (n) in the road map data.

[3. Outline of Guide Control]

Figure 3A:
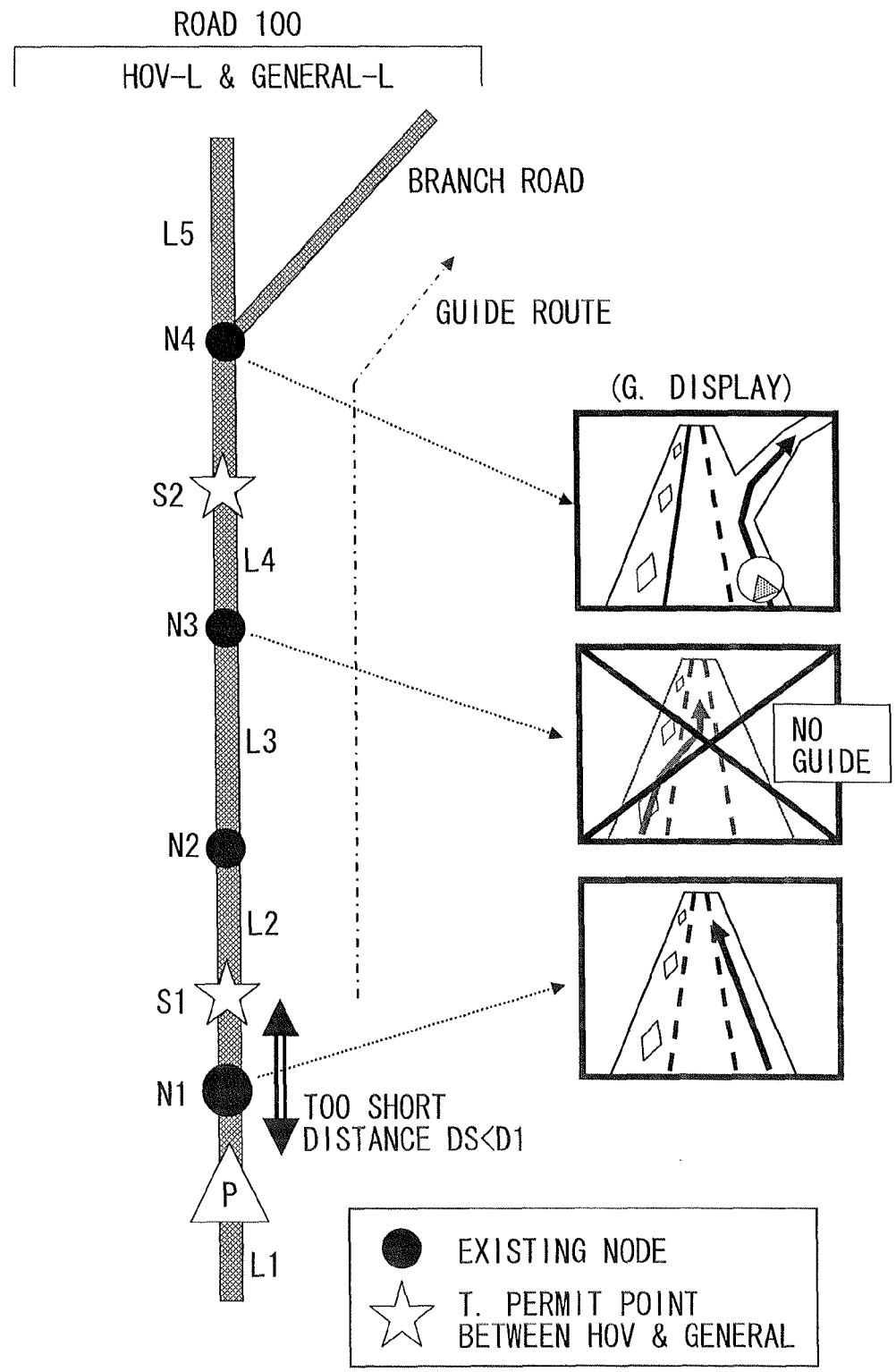
FIGS. 3A, 3B are diagrams explaining a guide control process according to the embodiment.
Figure 3B:
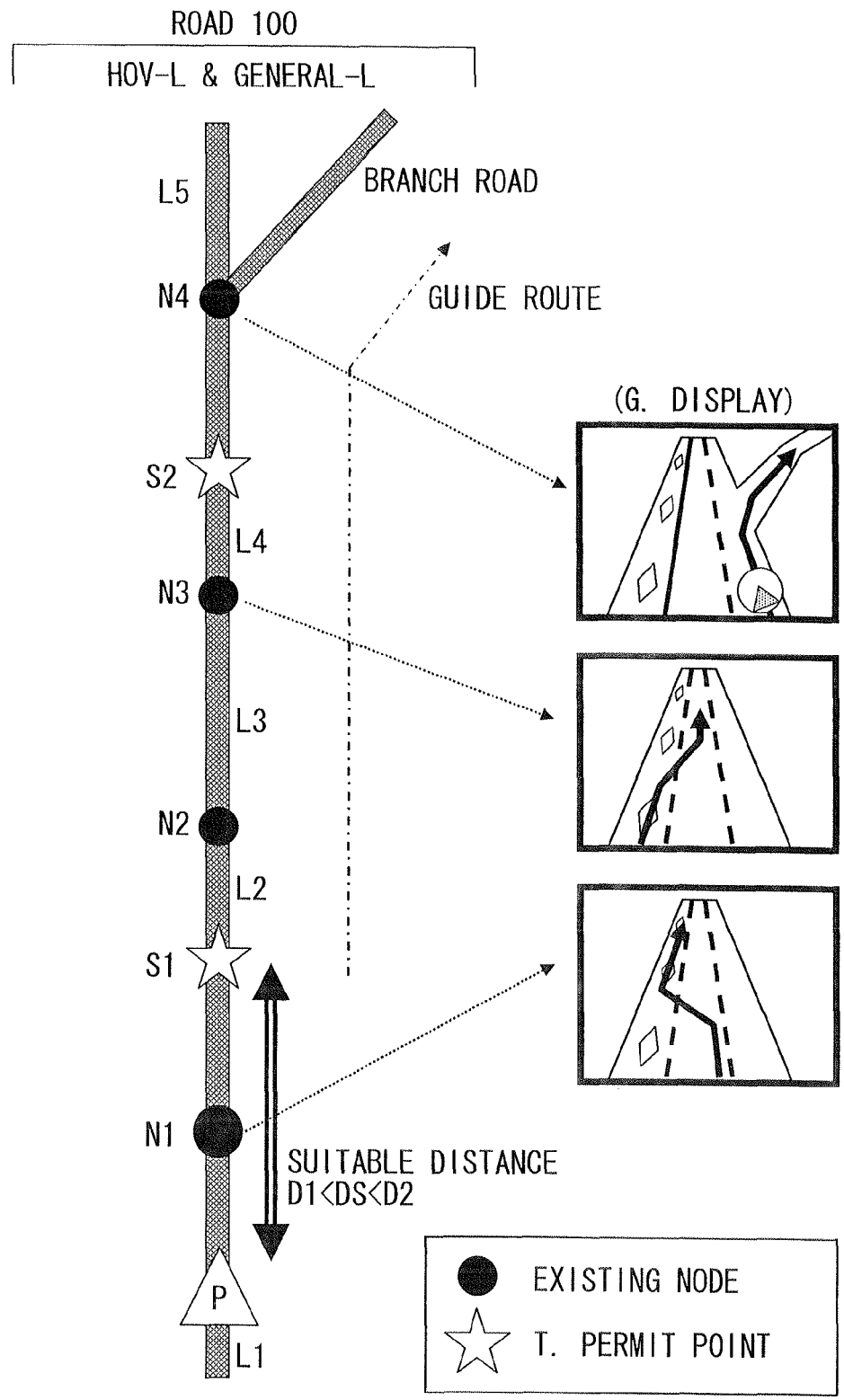
Figure 4:
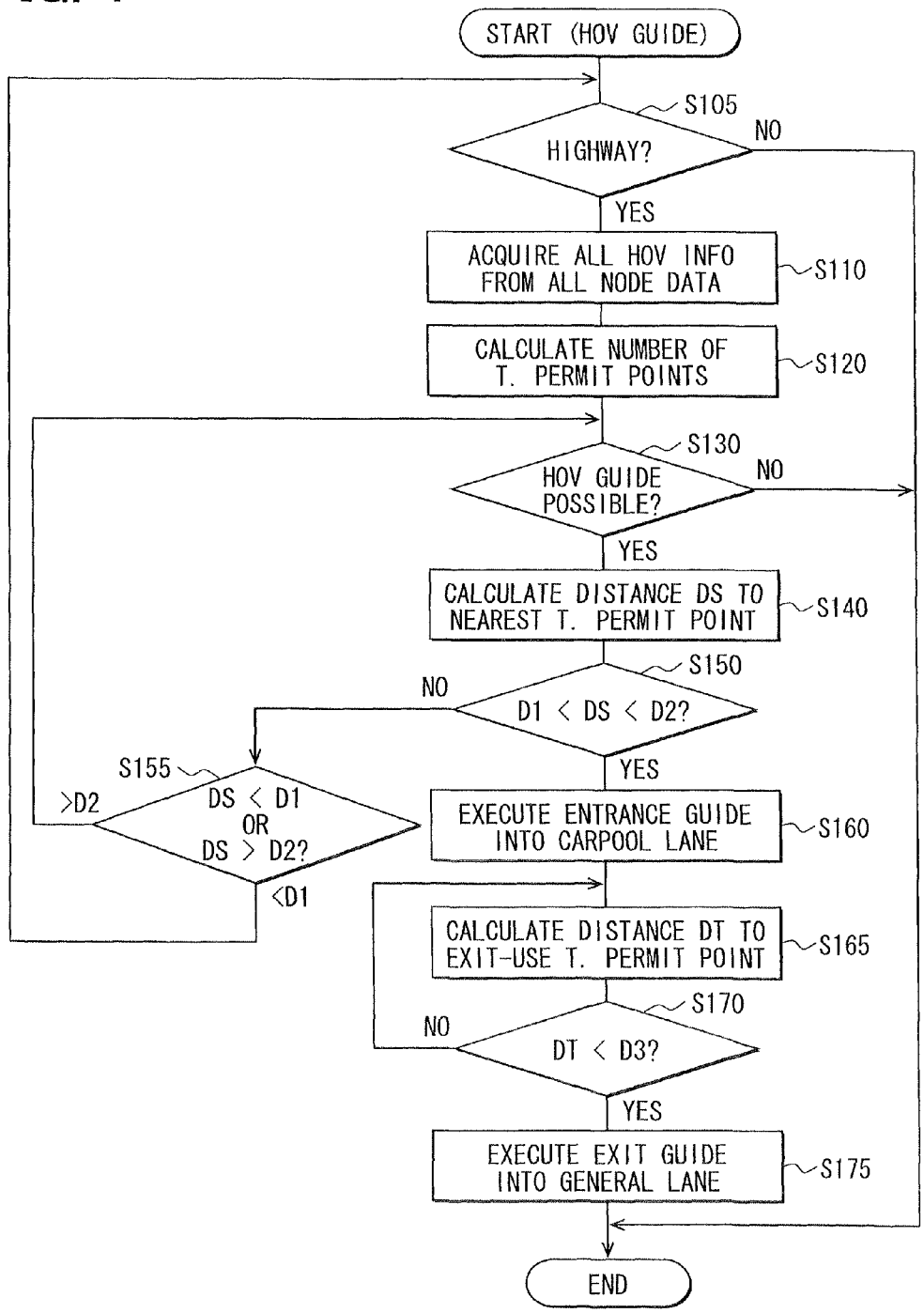
FIG. 4 is a flowchart diagram for illustrating a guide control process.
Figure 6:
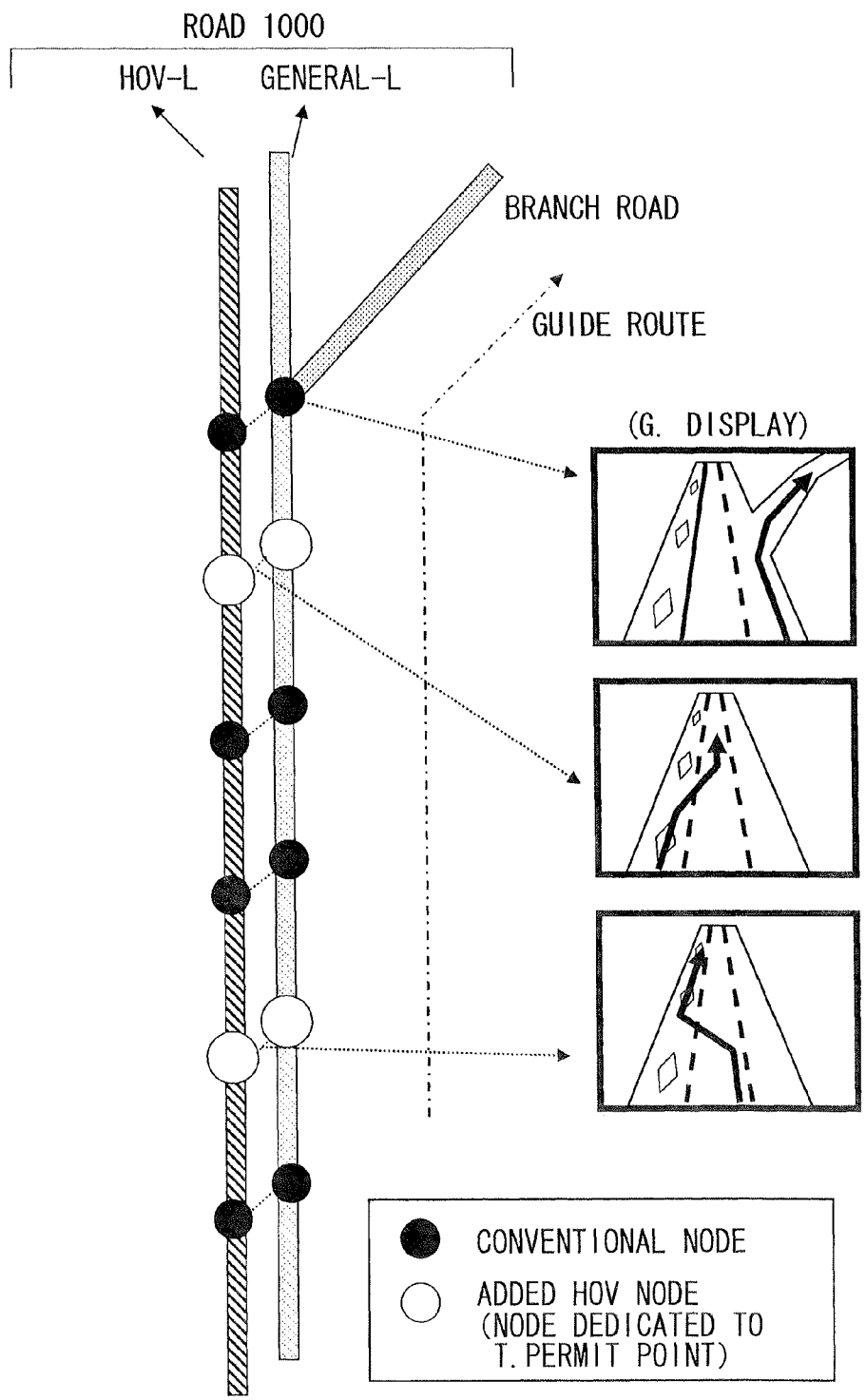
FIG. 6 is a diagram explaining a guide control process in a prior art.

Next, a guide control process executed by the control circuit 29 of the navigation apparatus 1 is explained with reference to FIGS. 3A, 3B, and a flowchart of FIG. 4. The guide control process provides a navigational guide control (i.e., HOV guide) to indicate an entrance to and an exit from a carpool lane (or HOV lane). FIGS. 3A, 3B are diagrams for explaining the guide control process according to the present embodiment. It is further noted that a flowchart or the processing of the flowchart in the present application includes sections (also referred to as steps), which are represented, for instance, as S105. Further, each section can be divided into several sub-sections while several sections can be combined into a single section. Furthermore, each of thus configured sections can be referred to as a means or unit and achieved not only as a software device but also as a hardware device.

The present process is executed independently from other processes when the accessory power source (unshown) of the vehicle is turned into an ON state and the navigation apparatus 1 is supplied with a power source. First, at S105, it is determined whether the subject vehicle is located in a highway. Even if it is the case where the vehicle is located near a carpool lane that is included in a local road, the present embodiment of the present invention can provide an effect. In this regard, however, in the following, explanation is made in the case where the subject vehicle is located in a highway.

When it is determined that the subject vehicle is not located in a highway (S105: NO), the present process is ended. In contrast, when it is determined that the vehicle is located in a highway (S105: YES), the processing advances to S110.

At S110, relative information of HOV (referred to as HOV information) is acquired from node data in the road map data. In detail, a present position is specified by the position detection device 21 and the road map data is inputted by the map data input device 25 from a map data storage medium. Based on the, specified present position and the inputted road map data, nodes are extracted which are included from a node nearest from the present position in the vehicle traffic direction or heading direction up to a node at which the subject vehicle is planned to exit from the road 100 to branch into another road of a branch road. Then, the HOV information contained in all the node data with respect to all the extracted nodes are acquired from the road map data.

At S120, the total number of transfer permit points is calculated from all the acquired HOV information with respect to all the extracted nodes. In detail, the total number of transfer permit points is calculated by totaling the numbers of transfer permit points contained in all the HOV information regarding the respective extracted nodes acquired at S110.

At S130, it is determined whether an HOV guide is possible. In detail, based on the total number of transfer permit points calculated at S120, the applicability of executing an HOV guide which provides a guide about a carpool lane is determined. That is, suppose a case that the total number of transfer permit points is only one. In such a case, it is impossible for the subject vehicle to once enter a; carpool lane via the only one transfer permit point and then exit from the carpool lane towards a branch road connected to the general lane. It is thus desirable that no guide be made with respect to the carpool lane. To that end, in the present embodiment, when the total number of transfer permit points is one, it is determined that any guide about the carpool lane cannot be executed. In contrast, when the total number of transfer permit points is more than one, it is determined that an HOV guide can be executed.

When it is determined that an HOV guide can be executed (S130: YES), the processing advances to S140. In contrast, when it is determined that an HOV guide cannot be executed (S130: NO), the present process is then ended.

At S140, a distance DS is calculated which is from the present position to a nearest transfer permit point which is nearest from the present position of the vehicle. This distance may be referred to as an entry distance. In detail the calculation is made by adding a distance from the present position to a nearest node that is nearest from the present position in the vehicle traffic direction, and a relative distance from the nearest node to the nearest transfer permit point, the relative distance which corresponds to the relative positional information of the HOV information contained in the node data of the nearest node. With reference to FIGS. 3A, 3B, the distance from the present position P of the subject vehicle to the nearest node N1 is calculated from the present position information and the positional information of the node N1; the calculated distance is added to the relative distance up to the transfer permit point S1, the relative distance which is indicated in the HOV information contained in the node data of the node N1, thereby obtaining a distance DS (also referred to as an entry distance DS) from the present position P to the nearest transfer permit point S1.

At S150, it is determined whether the distance DS from the present position P to the nearest transfer permit point S1 is in a predetermined distance range suitable for an entrance guide into a carpool lane. It is determined whether the distance DS to the transfer permit point nearest to the present position is within a predetermined distance range (D1<DS<D2). It is noted that the predetermined distance range is defined as having (i) a lower limit of an entrance possible distance (D1), which enables an entrance to the carpool lane and (ii) an upper limit of a guide suitable distance (D2) which is suitable to start the entrance guide.

When it is not determined that the distance from the present position to the nearest transfer permit point is within the predetermined distance range (S150: NO), the processing advances to S155, without executing an entrance guide towards the carpool lane (see FIG. 3A).

In contrast, when it is determined that the distance DS from the present position P to the nearest transfer permit point S1 is within the predetermined distance range (S150: YES), the processing advances to S160, thereby executing an entrance guide (i.e., HOV guide) into the carpool lane (see FIG. 3B). In the present embodiment, an image dedicated to the HOV guide is read out and displayed in the display device 26 when the subject vehicle reaches a predetermined position which is short of the corresponding transfer permit point with a margin (i.e., a suitable preparation time) in the vehicle heading direction. Thus, even in the case that the subject vehicle enters a carpool lane, there is no difference with the case in a usual road, thereby enabling an accurate guide. The processing then advances to S165.

As explained above, S155 is executed based on the negative determination at S150 that the distance DS from the present position P to the nearest transfer permit point S1 is outside of the predetermined suitable distance range. Thus, at S155, it is determined whether the distance DS from the present position P to the nearest transfer permit point S1 is greater than the predetermined distance range suitable for the entrance guide to a carpool lane (i.e., greater than the distance D2) or less than the predetermined distance range suitable for the entrance guide to a carpool lane (i.e., less than the distance D1).

When it is determined that the distance DS from the present position P to the nearest transfer permit point S1 is greater than the predetermined distance range suitable for the entrance guide to a carpool lane (i.e., greater than the distance D2) (S155: >D2), it is determined that it is too early to execute an entrance guide into the carpool lane, thereby returning the processing to S130, without executing an entrance guide into the carpool lane.

In contrast, when it is determined that the distance DS from the present position P to the nearest transfer permit point S1 is less than the predetermined distance range suitable for the entrance guide into a carpool lane (i.e., less than the distance D1) (S155: <D1), there is a possibility that the subject vehicle cannot enter the nearest transfer permit point. It is thus determined that it is too late to execute an entrance guide into the carpool lane, thereby not executing an entrance guide into the carpool lane. Instead, an image indicating no execution of an HOV guide is read out and displayed in the display device 26, then causing the processing to return to S105.

At S165, a distance DT (also referred to an exit distance) is calculated from the present position to a transfer permit point (referred to as an exit-use transfer permit point), which is used to exit from the present carpool lane to the general lane of the road 100. The exit-use transfer permit point is a transfer permit point nearest to a branch road to which the subject vehicle is planned to exit from the road 100, before the subject vehicle reaches the branch road. The calculation of the distance DT up to the exit-use transfer permit point is made by adding (i) the distance from the present position to a last node, which is short of and nearest to a branch node that is a node where the branch road intersects the currently traveled road 100, and (ii) the relative distance from the last node nearest to the branch node to the transfer permit point, the relative distance which is indicated by the HOV information in the node data of the last node nearest to the branch node. With reference to FIG. 3B, after the subject vehicle enters the carpool lane via the transfer permit point S1, the arithmetic addition or sum is made with respect to two distances: (i) the distance from the present position to the node N3, which is short of and nearest to the branch node N4, at which the guide route is branched from the road 100 to the branch road and (ii) the distance from the node N3 to the exit-use transfer permit point S2, the distance which is recorded as the HOV information contained in the node data of the node N3.

At S170, it is determined whether the distance DT from the present position P to the nearest exit-use transfer permit point S2 is within a predetermined distance range D3 suitable for an exit guide into a general lane from a carpool lane (i.e., less than D3). When it is not determined that the distance DT from the, present position P to the nearest exit-use transfer permit point S2 is within the predetermined distance range D3 suitable for an exit guide into a general lane (S170: NO), thereby not executing an exit guide into the general lane. In order to stand by until the distance DT becomes suitable for an exit guide into the general lane, the processing advances to S165.

In contrast, when it is determined that the distance DT from the present position P to the nearest exit-use transfer permit point S2 is within the predetermined distance range D3 suitable for an exit guide into a general lane (i.e., less than D3) (S170: YES), it is understood that the distance DT is suitable for the subject vehicle to exit from the carpool lane via the exit-use transfer permit point S2 (refer to FIG. 3B). The processing thus advances to S175, where an exit guide into the general lane is executed. In the present embodiment, an image dedicated to the HOV guide is read out and displayed in the display device 26 when the subject vehicle reaches a predetermined position which is short of the exit-use transfer permit point S2 with a margin (i.e., a suitable preparation time) in the vehicle heading direction. The present process is then ended.

[4. Effect of Embodiment]

(1) According to the navigation apparatus 1 of the present embodiment, effects are provided as below. That is, according to the navigation apparatus 1, the HOV information is added to a part of the node data, which has been established. During traveling of the subject vehicle, the above-mentioned guide control process is executed to thereby cause the following to take place. The HOV information is acquired from the node data (S110). The total number of transfer permit points is calculated from the acquired HOV information (S120). Based on the calculated total number of transfer permit points, it is determined whether an HOV guide is possible (S130). When it is determined that an HOV guide can be executed (S130: YES), the distance DS from the present position P to the nearest transfer permit point S1 is acquired (S140). It is determined whether the distance DS from the present position P to the nearest transfer permit point S1 is in a predetermined distance range suitable for an entrance guide into a carpool lane (S150). The determination is affirmed (S150: YES), it is understood that there is a suitable distance from the present position P to the nearest transfer permit point S1. Thereby an entrance guide (i.e., HOV guide) into the carpool lane is made (S160).

Thus, under the above configuration of the navigation apparatus 1, an appropriate route guide can be achieved for a vehicle running a predetermined road or road configuration having (i) a special lane a travel of which is allowed for the vehicle with a special condition satisfied and (ii) a general lane a travel of which is allowed for the vehicle without need of the special condition satisfied. The predetermined road further has a transfer permit point at which a vehicle is only allowed to access one of the special lane and the general lane from the other.

(2) Further, according to the navigation apparatus 1 of the present embodiment, what is just required is that the HOV information is added to a part of the node data or node information, which has been established. Thus, as compared with the case that new nodes and links are additionally prepared or generated in the road map data for the purpose of indicating the route information about the carpool lane, the data volume which should be increased is small and the time to require the preparation of it is short.

[5. Other Embodiments]

Although the embodiment is described above, the present invention is not limited to the embodiment and can be modified in various manners.

(1) In the above embodiment, as an example, the HOV lane (i.e., carpool lane) is specifically explained. In this regard, however, a similar problem arises with respect to a road or road configuration in which "a plurality of road lanes with an identical traffic direction of a single road include (i) a special lane and (ii) a general lane, wherein the special lane has no exit to another road while the general lane has an exit to another road; a reciprocal access between the special lane and the general lane is allowed only via a predetermined road point." Thus, to such a road configuration, the present invention may be applicable, similarly. Such an example of the above road configuration is a road configuration having an express lane and a local lane in an eastern region in the United States of America.

(2) Further, in the above embodiment, the relative positional information signifies information about a traveling distance detected or undergone when a vehicle travels along a traffic-directional road configuration of the road 100 from the certain node to the nearest transfer permit point. However, there is no need of restricting an embodiment to the above. For example, the relative positional information may be information on straight-lined direct distance between a node and a transfer permit point. Furthermore, the relative positional information may be information on travel time necessary for a vehicle to travel a road range from the relevant node to the transfer permit point under a regulation speed. In addition, all or some of those relative positional information items may be simultaneously used or adopted.

(3) In addition, in the navigation apparatus 1 of the above embodiment, the HOV information is added to a part of the node data or node information, which has been established. Without need to be limited to the above, alternatively, the HOV information may be provided independently from the road map data so as to be used for the same purpose as that of the above mentioned embodiment. In addition, the HOV information may be provided as a part of link data or link information in the road map data instead of as a part of the node data or node information.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded and installed in a non-transitory computer-readable storage media via a communications network.

Aspects of the disclosure described herein are set out in the following clauses.

As a first aspect of the disclosure, a navigation apparatus in a vehicle is provided as follows. The vehicle travels a predetermined road that includes, in an identical traffic direction, (i) a general lane having an exit into an other road and (ii) a special lane having no exit into an other road, the general lane and the special lane having a plurality of transfer permit points, at each of which the vehicle is only allowed to transfer between the general lane and the special lane. An information storage section is configured to store transfer permit point information which is associated with a node of a plurality of nodes, the transfer permit point information indicating (i) a number of transfer permit points, which are ahead of the node in the traffic direction and (ii) relative positional information indicating a positional relation between the transfer permit point and the node. A present position specification section is configured to specify a present position of the vehicle. A guide section is configured to provide a user with a navigational guide. A control circuit is configured to execute a predetermined navigation process based on the transfer permit point information stored in the information storage section and the present position specified by the present position specification section. The control circuit is further configured to, in the predetermined navigation process, (i) determine whether there is existing more than one transfer permit point ahead of the present position in the traffic direction between a nearest node, which is a node nearest from the present position, and a branch node, which is a node at which the vehicle exits from the predetermined road to an other road, (ii) calculate, when it is determined that there is existing more than one transfer permit point, an entry distance up to a nearest transfer permit point, which is a transfer permit point nearest to the present position among the more than one transfer permit point existing between the nearest node and the branch node, using the relative positional information corresponding to the nearest transfer permit point, (iii) determine whether the calculated entry distance is within a predetermined distance range, and (iv) provide information regarding the nearest transfer permit point via the guide section, when it is determined that the calculated entry distance is within the predetermined distance range.

It is noted that the transfer permit information may be contained as a part of node data of the road map data (i.e., contained additionally as one of several data elements contained in the node data of each node, which has been established in the conventional road map data).

Thus, as an optional aspect, the information storage section may also serve as a map data storage section to store road map data containing (i) link information of a link connecting an intersection with a next intersection on a road and (ii) node information of a node connecting more than two links. The transfer permit point information may be contained as a part of the node information in the predetermined road map data.

According to the above navigation apparatus, what is necessary is just to add relative positional information on transfer permit point into the existing node data. That is, information on transfer permit point can be assigned or provided so as to be added in the existing node data without need of additionally designating any new node and link dedicated for each transfer permit point. In comparison with the case that such information regarding a transfer permit point or a special lane is added as an independent node or link into the road map data, the data volume which should be increased is small and the time to require the preparation for it is short.

The above relative positional information can be used for calculating a distance with a transfer permit point nearest to the present position of several transfer permit points which exist between the nodes starting with the node nearest to the present position and ending with the node of the branch point.

As an optional aspect, the relative positional information indicated by the transfer permit point information associated with a node may include information regarding a traveling distance when the vehicle travels along the predetermined road from the node up to a transfer permit point.

As an optional aspect, the relative positional information indicated by the transfer permit point information associated with a node may include information regarding a straight-lined distance from the node up to a transfer permit point.

As an optional aspect, the relative positional information indicated by the transfer permit point information associated with a node may include information regarding a traveling time period required when the vehicle travels at a regulation speed along the predetermined road from the node up to a transfer permit point.

As an optional aspect, the special lane may be a lane which the vehicle is allowed to travel when the vehicle satisfies a special condition; and the general lane may be a lane which the vehicle is allowed regardless of whether the vehicle satisfies the special condition.

In addition, as an example of a special lane, a carpool lane or an express lane is referred to. The carpool lane exits as a road system in a highway (freeway) of a big city in the U.S., and also begins to spread to other nations. The express lane exists in an eastern region in the U.S., for instance. The special lane belongs to a lane that has no exit to another road. In contrast, the general lane belongs to a road that has an exit to another road. Herein, when the special lane is an express lane, a general lane is referred to as a local lane. It is noted that a predetermined transfer permit point is designated as a road point at which the vehicle is only allowed to reciprocally access one of the general lane and the special lane from the other.

As a further optional aspect, the special lane may be a carpool lane which the vehicle is allowed to travel when more than two persons including a driver of the vehicle are on the vehicle.

For example, the special lane may be referred to as "carpool" or "vanpool." The carpool lane requires a running vehicle to satisfy the above-mentioned special condition during the traveling. In contrast, in view of a road configuration, the carpool lane and the express lane are similar to each other. As a matter of course, the special lane need not be limited to a carpool lane or express lane as long as a road has a configuration similar to those lanes.

As an optional aspect, when the transfer permit information is stored in the information storage section, a number of nodes and a number of links may be maintained unchanged in the road map data.

As a second aspect of the disclosure, a navigation apparatus in a vehicle is provided as follows. A present position detection section is configured to detect a present position of the vehicle. A map data storage section is configured to store road map data including node information and link information. A route guide section is configured to retrieve a guide route from a present position to a destination based on the road map data stored in the map data storage section, and execute a navigational guide along the retrieved guide route. Herein: the node information contained in the map data storage section contains relative positional information indicating a relative position between a node and a predetermined permit road section nearest from the node, wherein the vehicle is only allowed via the predetermined permit road section to transfer between (i) one lane of a plurality of lanes in a predetermined road and (ii) an other lane of the plurality of lanes in the predetermined road; and the route guide section provides a navigational guide towards the predetermined permit road section based on the relative positional information and the present position detected by the present position detection section.

As an optional aspect, the route guide section may provide a navigational guide towards the predetermined permit road section in cases that an entry distance is within a predetermined distance range, the entry distance being calculated, as a distance from the present position to the predetermined permit road section, based on the relative positional information and the present position.

Thus, a route guide can be made in an appropriate road range.

As an optional aspect, in cases that the entry distance is less than the predetermined distance range, the route guide section may provide a display of an image which illustrates that no navigational guide towards the predetermined permit road range is executed.

Under such a configuration, when the navigational guide to the special lane is practically difficult, there is an advantage to clarify the difficulty or notify a user of the difficulty. Thus, the driver or user understands the reason why the navigational guide is not executed even if the user can see a transfer permit point just ahead. This can provide the user with a sense of ease.

As an optional aspect, in cases that the retrieved guide route includes a branch point to exit from the predetermined road to a branch road, only when more than one predetermined permission road section exists from the present position up to the branch point, the route guide section may provide the navigational guide towards the predetermined permit road section.

Such a configuration can prevent wrong navigational guide when the vehicle will be unable to exit to a branch road, thereby enabling a suitable route guide.

In addition, only when a vehicle is running a highway, the above-mentioned featured process may be executed.

That is, as an optional aspect, a road determination section may be configured to determine whether the vehicle travels a highway. When it is determined that the vehicle travels the highway, the route guide section may provide the navigational guide towards the predetermined permit road section.

Thus, while being not executed in all the roads the vehicle travels, the above process may be executed in a highway in which a special lane such as an HOV lane or a carpool lane, thereby reducing the load in the process.

According to an embodiment, the map data storage section stores road map data containing (i) link information of a link connecting an intersection with a next intersection on a road and (ii) node information of a node connecting more than two links; the transfer permit point information is provided by being added as a part of the node information in the road map data. Further, when the transfer permit information is added in the road map data, a number of nodes and a number of links are maintained unchanged in the road map data.

It will be obvious to those skilled in the art that various changes may be made in the above-described embodiments of the present invention. However, the scope of the present invention should be determined by the following claims.

What is claimed is:

1. A navigation apparatus in a vehicle traveling a predetermined road that includes, in an identical traffic direction, (i) a general lane having an exit into an other road and (ii) a special lane having no exit into an other road, the general lane and the special lane having a plurality of transfer permit points, at each of which the vehicle is only allowed to transfer between the general lane and the special lane, the navigation apparatus comprising:
an information storage section configured to store transfer permit point information which is associated with a first node of a plurality of nodes, the transfer permit point information indicating (i) a numerical value, wherein the numerical value represents how many transfer permit points are between the first node and a second node, which are ahead of the first node in the traffic direction, wherein the first node is adjacent to the second node without any nodes in-between the first node and the second node, and (ii) relative positional information indicating a positional relation between the first node and the transfer permit point which is between the first node and the second node;
a present position specification section configured to specify a present position of the vehicle;
a guide section configured to provide a user with a navigational guide; and
a control circuit configured to execute a predetermined navigation process based on the transfer permit point information stored in the information storage section and the present position specified by the present position specification section, the control circuit being further configured to, in the predetermined navigation process,
(i) determine whether there is existing more than one transfer permit point ahead of the present position in the traffic direction between a nearest node, which is a node nearest from the present position, and a branch node, which is a node at which the vehicle exits from the predetermined road to an other road, (ii) calculate, when it is determined that there is existing more than one transfer permit point, an entry distance up to a nearest transfer permit point, which is a transfer permit point nearest to the present position among the more than one transfer permit point existing between the nearest node and the branch node, using the relative positional information corresponding to the nearest transfer permit point, (iii) determine whether the calculated entry distance is within a predetermined distance range, and (iv) provide information regarding the nearest transfer permit point via the guide section, when it is determined that the calculated entry distance is within the predetermined distance range, wherein:

the information storage section also serves as a map data storage section to store road map data containing (i) link information of a link connecting a first intersection with a second intersection on a road, wherein the second intersection is adjacent to the first intersection without any intersections in-between the first intersection and the second intersection, and (ii) node information of a node connecting more than two links, the node information of the node containing a plurality of data elements; and the transfer permit point information is contained as information relative to the node in one of the data elements of the node information of the predetermined road including the general lane and the special lane.

2. The navigation apparatus according to claim 1, wherein the relative positional information indicated by the transfer permit point information associated with a node includes information regarding a traveling distance when the vehicle travels along the predetermined road from the node up to a transfer permit point.

3. The navigation apparatus according to claim 1, wherein the relative positional information indicated by the transfer permit point information associated with a node includes information regarding a straight-lined distance from the node up to a transfer permit point.

4. The navigation apparatus according to claim 1, wherein the relative positional information indicated by the transfer permit point information associated with a node includes information regarding a traveling time period required when the vehicle travels at a regulation speed along the predetermined road from the node up to a transfer permit point.

5. The navigation apparatus according to claim 1, wherein:
the special lane is a lane which the vehicle is allowed to travel when the vehicle satisfies a special condition; and
the general lane is a lane which the vehicle is allowed regardless of whether the vehicle satisfies the special condition.

6. The navigation apparatus according to claim 5, wherein the special lane is a carpool lane which the vehicle is allowed to travel when more than two persons including a driver of the vehicle are on the vehicle.

7. The navigation apparatus according to claim 1, wherein when the transfer permit point information is contained in the information storage section serving as the map data storage section as one of the plurality of data elements of the node information of the predetermined road that includes the general lane and the special lane, a numerical value which represents how many nodes and a numerical value which represents how many links of the predetermined road are maintained unchanged in the road map data.

8. The navigation apparatus according to claim 1, wherein the transfer permit point information of a transfer permit point is contained in the information storage section serving as the map data storage section as one of the plurality of data elements of the node information of the predetermined road that includes the general lane and the special lane, without assigning an additional node solely dedicated for the transfer permit point.

9. A navigation apparatus in a vehicle, the navigation apparatus comprising:
a present position detection section configured to detect a present position of the vehicle;
a map data storage section configured to store road map data including (i) node information that contains a plurality of data elements and (ii) link information; and
a route guide section configured to retrieve a guide route from a present position to a destination based on the road map data stored in the map data storage section, and execute a navigational guide along the retrieved guide route, wherein:
one of the plurality of data elements of the node information contained in the map data storage section contains relative positional information indicating a relative position between a first node and a predetermined permit road section nearest from the first node, wherein the predetermined permit road section nearest from the first node is between the first node and a second node, wherein the second node is adjacent to the first node without any nodes in-between the first node and the second node, wherein the vehicle is only allowed via the predetermined permit road section to transfer between (i) one lane of a plurality of lanes in a predetermined road and (ii) an other lane of the plurality of lanes in the predetermined road; and
the route guide section provides a navigational guide towards the predetermined permit road section based on the relative positional information and the present position detected by the present position detection section, wherein:
the map data storage section stores the road map data which contains (i) link information of a link connecting a first intersection with a second intersection on a road, wherein the second intersection is adjacent to the first intersection without any intersection in-between the first intersection and the second intersection, and (ii) node information of a node connecting more than two links, the node information of the node containing a plurality of data elements; and
the transfer permit point information is contained as information relative to the node in one of the data elements of the node information of the predetermined road including the general lane and the special lane.

10. The navigation apparatus according to claim 9, wherein the route guide section provides a navigational guide towards the predetermined permit road section in cases that an entry distance is within a predetermined distance range, the entry distance being calculated, as a distance from the present position to the predetermined permit road section, based on the relative positional information and the present position.

11. The navigation apparatus according to claim 10, wherein
in cases that the entry distance is less than the predetermined distance range, the route guide section provides a display of an image which illustrates that no navigational guide towards the predetermined permit road range is executed.

12. The navigation apparatus according to claim 9, wherein
in cases that the retrieved guide route includes a branch point to exit from the predetermined road to a branch road,
only when more than one predetermined permission road section exists from the present position up to the branch point,
the route guide section provides the navigational guide towards the predetermined permit road section.

13. The navigation apparatus according to claim 9, further comprising:
a road determination section configured to determine whether the vehicle travels a highway,
when it is determined that the vehicle travels the highway, the route guide section provides the navigational guide towards the predetermined permit road section.

14. The navigation apparatus according to claim 9, wherein
when the relative positional information indicating a relative position between a node and a predetermined permit road section nearest from the node is contained in one of the plurality of data elements of the node information of the predetermined road,
a numerical value which represents how many nodes and a numerical value which represents how many links of the predetermined road are maintained unchanged in the road map data.

15. The navigation apparatus according to claim 9, wherein
the relative positional information indicating the relative position between the node and the predetermined permit road section nearest from the node is contained in the map data storage section as one of the plurality of data elements of the node information of the predetermined road, without assigning an additional node solely dedicated for the predetermined permit road section.

16. A program product stored in a non-transitory computer readable storage medium comprising instructions for execution by a computer, the instructions including a method being computer-implemented, the method for a predetermined navigational process in a navigation apparatus in a vehicle traveling a predetermined road that includes, in an identical traffic direction, (i) a general lane having an exit into an other road and (ii) a special lane having no exit into the other road, the general lane and the special lane having a plurality of transfer permit points, at each of which the vehicle is only allowed to transfer between the general lane and the special lane,
the navigation apparatus including
a map data storage section configured to store road map data;
a present position specification section configured to specify a present position of the vehicle;
a guide section configured to provide a user with a navigational guide; and
a control circuit executing the method for the predetermined navigation process, the method comprising:
providing, into the map data, transfer permit point information which is associated with a first node of a plurality of nodes, the transfer permit point information indicating (i) a numerical value which indicates how many transfer permit points are between the first node and a second node, which are ahead of the first node in the traffic direction, wherein the second node is adjacent to the first node without any nodes in-between the first node and the second node, and (ii) relative positional information indicating a positional relation between the first node and the transfer permit point which is between the first node and the second node;
determining whether there is existing more than one transfer permit point ahead of the present position in the traffic direction between a nearest node, which is a node nearest from the present position, and a branch node, which is a node at which the vehicle exits from the predetermined road to the other road;
calculating, when it is determined that there is existing more than one transfer permit point, an entry distance up to a nearest transfer permit point, which is a transfer permit point nearest to the present position among the more than one transfer permit point existing between the nearest node and the branch node, using the relative positional information corresponding to the nearest transfer permit point;
determining whether the calculated entry distance is within a predetermined distance range; and
providing information regarding the nearest transfer permit point via the guide section, when it is determined that the calculated entry distance is within the predetermined distance range,
wherein:
the map data storage section stores road map data containing (i) link information of a link connecting a first intersection with a second intersection on a road, wherein the second intersection is adjacent to the first intersection without any intersections in-between the first intersection and the second intersection and (ii) node information of a node connecting more than two links, the node information of the node containing a plurality of data elements;
the transfer permit point information is provided by being added as information relative to the node in one of the plurality of data elements of the node information of the predetermined road including the general lane and the special lane; and
a numerical value which represents how many nodes and a numerical value which represents how many links of the predetermined road are maintained unchanged in the road map data even when the transfer permit information is added into one of the data elements of the node information of the predetermined road in the road map data.

17. A navigation apparatus in a vehicle traveling a predetermined road that includes, in an identical traffic direction, (i) a general lane having an exit into an other road and (ii) a special lane having no exit into an other road, the general lane and the special lane having a plurality of transfer permit points, at each of which the vehicle is only allowed to transfer between the general lane and the special lane,
the navigation apparatus comprising:
a map data storage section configured to store road map data including (i) node information containing a plurality of data elements and (ii) link information, wherein
one of the plurality of data elements of the node information with respect to a general lane of a predetermined road stores transfer permit point information which is associated with a first node of a plurality of nodes of the general lane,
the transfer permit point information indicates (i) a numerical value which represents how many transfer permit points are between the first node and a second node, which are ahead of the first node of the general lane in a traffic direction, wherein the second node is adjacent to the first node without any nodes in-between the first node and the second node, and (ii) relative positional information indicating a positional relation between the first node of the general lane and the transfer permit point which is between the first node and the second node, the road map data does not store any node information or any link information, which are solely dedicated for the special lane of the predetermined road;

a present position specification section configured to specify a present position of the vehicle;

a guide section configured to provide a user with a navigational guide; and a control circuit configured to execute a predetermined navigation process based on the transfer permit point information contained in one of the plurality of data elements of the node information with respect to the general lane stored in the map data storage section and the present position specified by the present position specification section, the control circuit being further configured to, in the predetermined navigation process, (i) determine whether there is existing more than one transfer permit point ahead of the present position in the traffic direction between a nearest node, which is a node nearest from the present position, and a branch node, which is a node at which the vehicle exits from the predetermined road to an other road, (ii) calculate, when it is determined that there is existing more than one transfer permit point, an entry distance up to a nearest transfer permit point, which is a transfer permit point nearest to the present position among the more than one transfer permit point existing between the nearest node and the branch node, using the relative positional information corresponding to the nearest transfer permit point, (iii) determine whether the calculated entry distance is within a predetermined distance range, and (iv) provide information regarding the nearest transfer permit point via the guide section, when it is determined that the calculated entry distance is within the predetermined distance range.

* * * * *